(12) United States Patent
Kayukawa et al.

(10) Patent No.: US 6,758,293 B2
(45) Date of Patent: Jul. 6, 2004

(54) CONTROL SYSTEM AND METHOD FOR STARTING AN ICE IN A HYBRID VEHICLE

(75) Inventors: Atsushi Kayukawa, Anjo (JP); Yoshitaka Murase, Anjo (JP); Eiji Takasu, Anjo (JP); Chikashi Satou, Anjo (JP)

(73) Assignee: Aisin Aw Co., Ltd. (JP)

( * ) Notice: Subject to any disclaimer, the term of this patent is extended or adjusted under 35 U.S.C. 154(b) by 55 days.

(21) Appl. No.: 10/157,043

(22) Filed: May 30, 2002

(65) Prior Publication Data

US 2002/0195287 A1 Dec. 26, 2002

(30) Foreign Application Priority Data

Jun. 6, 2001 (JP) ........................... 2001-170869

(51) Int. Cl.⁷ .................................................. B60K 1/00
(52) U.S. Cl. ............................................. 180/65.2; 477/3
(58) Field of Search ........................... 180/65.2, 65.3, 180/65.4, 65.6, 65.7, 65.8; 701/22; 318/139; 471/2, 3, 4, 5; 475/5; 290/41, 40 C, 40 B, 40 F; 322/14, 15, 16; 123/491

(56) References Cited

U.S. PATENT DOCUMENTS 6,247,437 B1 * 6/2001 Yamaguchi et al. ..... 123/179.3
6,424,798 B1 * 7/2002 Kitamine .................... 388/800
2001/0025621 A1 * 10/2001 Shiraishi et al. ............ 123/305

FOREIGN PATENT DOCUMENTS

| JP | 2001-193612 | * | 7/2001 |
| JP | 2002-15774 | * | 5/2002 |
| JP | 2003-42047 | * | 2/2003 |

* cited by examiner

Primary Examiner—Bryan Fischmann
(74) Attorney, Agent, or Firm—Lorusso, Loud & Kelly

(57) ABSTRACT

A control system for a hybrid vehicle accurately determines the start (i.e. ignition) of an internal combustion engine and suppresses the peak PK in the actual rotational speed. The hybrid vehicle is provided with a motor control unit for, at the time of starting the internal combustion engine, driving the motor to rotate at a target motor rotational speed and with a vehicle control unit for, when the rotational speed of the internal combustion engine has reached a predetermined value, outputting an ignition command to start the internal combustion engine. After the ignition command is output to the internal combustion engine, the vehicle control unit calculates the difference between the target rotational speed of the motor and the actual rotational speed of the motor, and if the difference exceeds a predetermined value, determines that the ignition of the internal combustion engine has been effected. In this manner, the start of the internal combustion engine can be accurately detected. Once start of the internal combustion engine has been confirmed, the motor is controlled accordingly. As a result, the peak PK is suppressed.

7 Claims, 5 Drawing Sheets

|     | C1 | C2 | C3 | B1 | B2 | B3 | B4 | B5 | F1 | F2 |
|-----|----|----|----|----|----|----|----|----|----|----|
| N   |    |    |    |    |    |    |    | ○  |    |    |
| 1ST | ○  |    |    |    |    | △  |    | ○  |    | ○  |
| 2ND | ○  |    |    | △  | ○  |    |    | ○  | ○  |    |
| 3RD | ○  |    |    | △  | ○  |    | ○  |    | ○  |    |
| 4TH | ○  |    | ○  | △  | ○  |    |    |    | ○  |    |
| 5TH | ○  | ○  | ○  |    |    |    |    |    |    |    |
| REV |    | ○  |    |    |    | ○  |    | ○  |    |    |

<ART ACCORDING TO THE PRESENT INVENTION>

CONTROL SYSTEM AND METHOD FOR STARTING AN ICE IN A HYBRID VEHICLE

CROSS-REFERENCE TO RELATED APPLICATION

This application claims priority of Japanese Application No. 2001-170869 filed June 6, 2001.

BACKGROUND OF THE INVENTION

1. Field of Invention

The present invention relates to a control system and to a method of control for a hybrid vehicle which uses an internal combustion engine and a motor/generator as drive power sources.

2. Description of Related Art

FIG. 6 is a time chart showing a target motor rotational speed at the time of starting of an internal combustion engine, actual motor rotational speed, and a brake signal in a conventional hybrid vehicle.

Conventionally, at the time of starting the internal combustion engine, a motor is used to drive an internal combustion engine at its idling rotational speed. (Herein, the term "a motor" includes a motor/generator which regeneratively uses a motor as a generator). Subsequently, the internal combustion engine is started.

However, the conventional method described above requires a large driving torque because the motor must bring the internal combustion engine from a non-rotating state to a predetermined rotational speed. Once the internal combustion engine is started (ignited), it starts to rotate independently and no longer needs to be driven by the motor. Therefore, immediately after the internal combustion engine is started (ignited), as shown in FIG. 6, the output torque of the motor and the output torque of the internal combustion engine are combined. As a result, a peak PK which exceeds a target motor rotational speed TgtmtN is generated as an actual motor rotational speed mtN.

The peak PK which occurs in the rotational speed output from the combined drive sources causes a fluctuation in the rotational speed of the wheels of the vehicle, which fluctuation is felt as an undesirable impact by the driver. Therefore, it is desirable to suppress the peak PK to the extent possible.

SUMMARY OF THE INVENTION

Suppression of the peak PK becomes possible if, when the internal combustion engine is started (ignited), its start is accurately detected and the motor drive is stopped. For this reason, there is a demand for development of a control system capable of accurately detecting the point in time when the internal combustion engine has been started (ignited).

Accordingly, it is an object of the present invention to provide a control system and control method for a hybrid vehicle, which are capable of accurately detecting the start (ignition) of an internal combustion engine in the hybrid vehicle, and also suppressing the peak PK of actual motor rotational speed to the extent possible.

Accordingly, the present invention provides a control system for a hybrid vehicle which includes an internal combustion engine with a motor drivably connected thereto and, more particularly, a control system for starting the internal combustion engine in such a hybrid vehicle. The control system includes a motor control unit for driving the motor to cause the motor to rotate at a predetermined target motor rotational speed in preparation for starting the internal combustion engine. The control system further includes an internal combustion engine drive control unit for, responsive to the rotational speed of the internal combustion engine reaching the predetermined target rotational speed, outputting an ignition command to start the internal combustion engine. Still further, the control system includes an internal combustion engine ignition determining unit for, after output of the ignition command, determining the difference between the target rotational speed of the motor and the actual rotational speed of the motor and, if the determined difference exceeds a predetermined value, confirming that the internal combustion engine has been started.

In a preferred embodiment the control system further includes a target motor rotational speed setting unit which, responsive to confirmation of start of the internal combustion engine, resets the target rotational speed to a lower value. The resetting to a lower value may be based on the determined difference between the target rotational speed and the actual rotational speed of the motor.

Preferably, the control system is applied to a hybrid vehicle wherein the output shafts of the motor and internal combustion engine are directly connected.

In another aspect, the present invention provides a method for starting an internal combustion engine in a hybrid vehicle wherein the internal combustion engine is drivably connected to a motor. The method includes energizing the motor to cause the motor to drive the internal combustion engine to bring the rotational speed of the internal combustion engine from zero to a target rotational speed. Responsive to reaching the target rotational speed, fuel is injected into the internal combustion engine and an ignition command signal is issued. Subsequent output of the ignition command signal, the difference between the actual rotational speed of the motor and the target rotational speed is determined and the starting of the internal combustion engine is confirmed when the determined difference exceeds a predetermined value.

Preferably, the control method resets the target rotational speed to a lower value responsive to confirmation of start of the internal combustion engine and drives the motor at that lower, reset rotational speed. The target rotational speed may be reset based on the determined difference between the actual motor rotational speed and the target motor rotational speed.

DETAILED DESCRIPTION OF PREFERRED EMBODIMENTS

Figure 1:
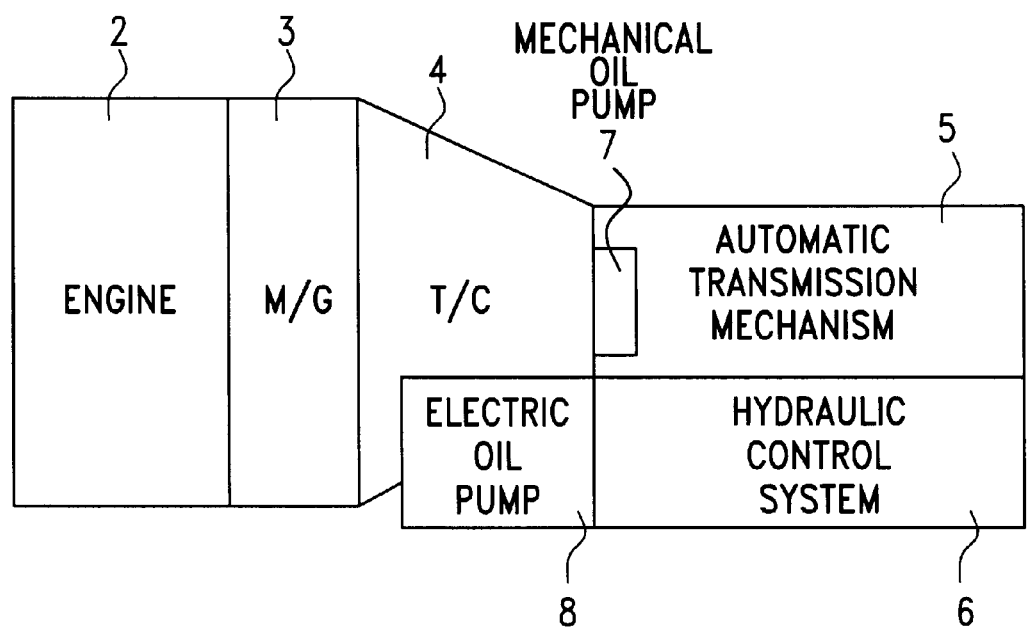
FIG. 1 is a schematic diagram showing a drive system of a vehicle according to the present invention.

A first embodiment of the present invention is shown in FIG. 1 which is a schematic diagram showing a drive system of a vehicle according to the present invention. As shown in the figure, the drive sources of a hybrid vehicle include an engine 2 and a motor/generator (M/G) 3 which are mounted on the vehicle body. An output shaft of the engine 2 and an output shaft of the motor/generator 3 are directly connected to each other, and their drive forces are output to an automatic transmission mechanism 5 via a torque converter (T/C) 4.

The automatic transmission mechanism 5, shown in FIG. 1, to which the engine 2 and the motor/generator (M/G) 3 are connected, changes the drive force and/or rotational speed input thereinto, based on traveling status of the vehicle, and outputs the drive force to the wheels and various accessories. The automatic transmission mechanism 5 includes a plurality of friction engagement elements for a shift change and a hydraulic control system 6 for control of the engagement of the friction engagement elements in a speed change, and also for control of the torque converter 4. The automatic transmission mechanism 5 also includes a mechanical oil pump 7 and an electric oil pump 8 which are respectively used to input hydraulic pressure to the hydraulic control system 6. The mechanical oil pump 7 works in cooperation with the torque converter 4, and is driven by the drive forces supplied from the engine 2 and the motor/generator 3. The electric oil pump 8 is independent of the driving forces of the engine 2 and the motor/generator 3, and is driven by a motor which receives electric power supply from a battery (unillustrated).

Figures 2A, 2B:
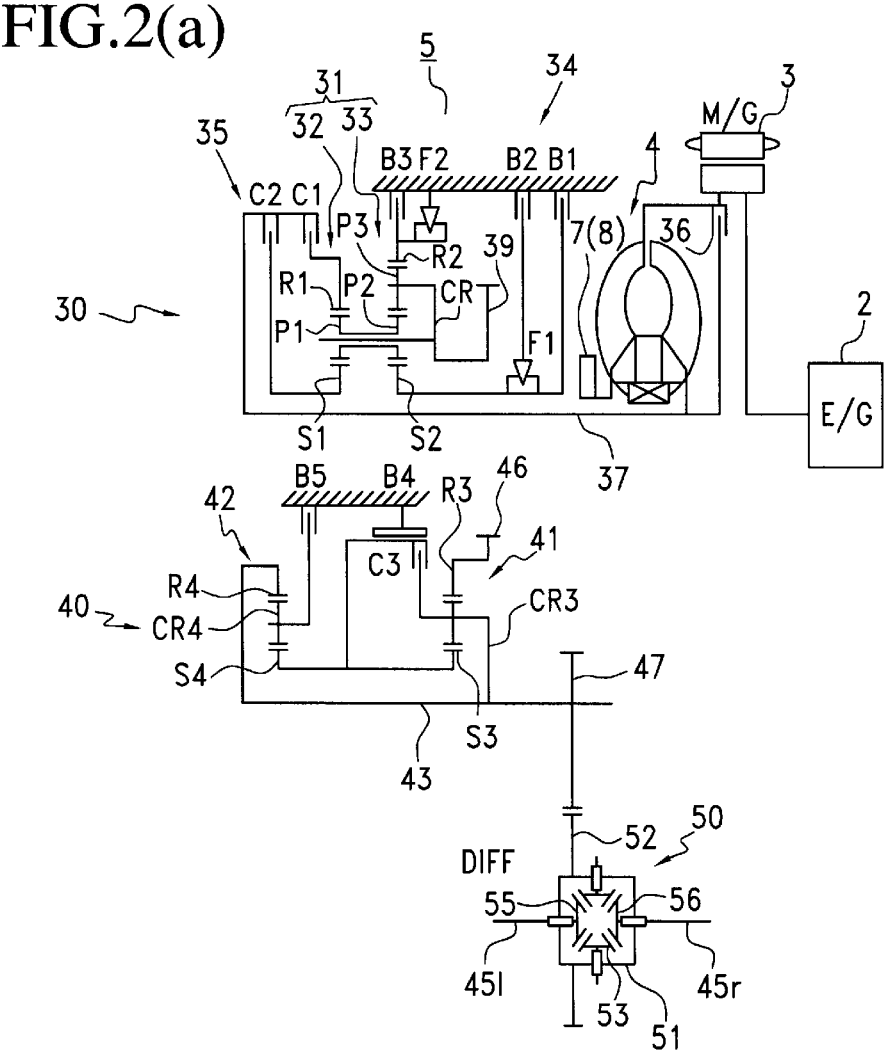
FIG. 2(a) is a skeletal diagram of an automatic transmission mechanism which may be equipped with the control system of the present invention.
FIG. 2(b) is an operation table thereof.

Next, the automatic transmission mechanism will be explained with reference to FIG. 2(a), which is a diagram of the automatic transmission mechanism 5 employed in the present invention, and FIG. 2(b) which is a table of operations thereof. As shown in FIG. 2(a), a main automatic transmission mechanism 30 includes an input shaft 37. The input shaft 37 is disposed as a first shaft aligned with an engine output shaft, and receives a drive force transmitted from the engine 2 (E/G) and the motor/generator (M/G) 3 via the torque converter 4 having a lock-up clutch 36. On the first shaft, disposed in the following order, are the mechanical oil pump 7 and the electric oil pump 8 which are adjacent to the torque converter 4, a brake section 34, a planetary gear unit 31, and a clutch section 35.

The planetary gear unit 31 includes a simple planetary gear unit 32 and a double pinion planetary gear unit 33. The simple planetary gear unit 32 includes a sun gear S1, a ring gear R1, and a carrier CR for supporting a pinion P1 which is meshed with these gears. The double pinion planetary gear unit 33 includes a sun gear S2, a ring gear R2, and a carrier CR for supporting a pinion P2 which is meshed with the sun gear S2 and a pinion P3 which is meshed with the ring gear R2 in such a manner that the pinions P2 and P3 are also meshed with each other. The sun gear S1 and the sun gear S2 are respectively rotatably supported by a hollow shaft which, in turn, is rotatably supported by the input shaft 37. The carrier CR is common to the planetary gears 32, 33. The pinion P1 and the pinion P2, which are meshed with the sun gear S1 and the sun gear S2, respectively, are connected to each other so as to rotate together.

The brake section 34 includes a one-way clutch F1, a brake B1, and a brake B2 disposed in this order radially outward. A counter-drive gear 39 is splined to the carrier CR. Further, a one-way clutch F2 is present on the ring gear R2, and a brake B3 is located between the outer periphery of the ring gear R2 and the case. The clutch section 35 includes a forward clutch C1 and a direct clutch C2. The forward clutch C1 is present on the outer periphery of the ring gear R1. The direct clutch C2 is located between the inner periphery of a movable member (unillustrated) and a flange section connected to an end of the hollow shaft.

A sub-transmission mechanism 40 is disposed on a second shaft 43 which is disposed in parallel with the first shaft, i.e., input shaft 37. When viewed from their ends, the first shaft and the second shaft, together with a third shaft including differential shafts (left and right axles) 45*l*, 45*r*, are arranged in the shape of a triangle. The sub-transmission mechanism 40 includes: simple planetary gear units 41, 42, a carrier CR3 and a ring gear R4 integrally connected to each other, and sun gears S3 and S4 integrally connected to each other, to form a Simpson type gear train. A ring gear R3 is connected to a counter-driven gear 46 to serve as an input section, and a carrier CR3 and a ring gear R4 are connected to a reduction gear 47 to serve as an output section. An under drive (UD) direct clutch C3 is present between the ring gears R3 and the integrated sun gears S3, S4. The integrated sun gears S3, S4 can be engaged by the brake B4 and thereby stopped, and the carrier CR4 can be engaged by the brake B5 and thereby stopped. This sub-transmission mechanism 40 provides three forward speeds.

A differential unit 50, constituting a "third shaft," has a differential case 51 and a gear 52, which is meshed with the reduction gear 47, is fixed to the differential case 51. A differential gear 53 and left and right side gears 55, 56 are supported in the differential case 51 with the differential gear 53 and the left and right side gears 55, 56 rotatably meshed with each other. Left and right axles 45*l*, 45*r* extend from the left and right side gears 55, 56. Due to this structure, the rotation transmitted from the gear 52 is branched in accordance with the load torque, and is then transmitted to the left and right front wheels via the left and right axles 45*l*, 45*r*.

Next, operation of the automatic transmission mechanism 5 will be explained, with reference to the table of operations shown in FIG. 2(b). In first (1ST) speed, the forward clutch C1, the one-way clutch F2, and the brake B5 are engaged. As a result, the main transmission mechanism 30 is put in first speed, and rotation at the reduced speed is transmitted to the ring gear R3 of the sub-transmission mechanism 40 via the counter gears 39, 46. In the sub-transmission mechanism 40, the carrier CR4 is stopped by the brake B5 and, therefore, the sub-transmission mechanism 40 is operated in first speed. The rotation at the reduced speed of the main transmission mechanism 30 is further slowed by the sub-transmission mechanism 40, and is then transmitted to the wheels 45*l*, 45*r* via the gears 47, 52 and the differential unit 50.

In second (2ND) speed, in addition to engagement of the forward clutch C1, the brake B2 is engaged, and engagement of the one-way clutch F2 is smoothly switched to engagement of the clutch F1. As a result, the main transmission mechanism 30 is shifted to a second speed stage. The sub-transmission mechanism 40 is in first speed due to the engagement of the brake B5. The combination of the first speed state of the main transmission mechanism 30 and the second speed state of the sub-transmission mechanism 40, provides the automatic transmission mechanism 5 as a whole with operation at the second speed.

In third (3RD) speed, the main transmission mechanism 30 is in the same state as in second speed where the forward clutch C1, the brake B2, and the one-way clutch F1 are engaged. In addition, the sub-transmission mechanism 40 engages the brake B4. As a result, the sun gears S3, S4 are fixed and the rotation transmitted from the ring gear R3 is output from the carrier CR3 as rotation at the second speed. The combination of the second speed state of the main transmission mechanism 30 and the second speed state of the sub-transmission mechanism 40, gives the automatic transmission mechanism 5, as a whole, operation in third speed.

In fourth (4TH) speed, the main transmission mechanism 30 is in the same state as the second and third speeds where the forward clutch C1, the brake B2, and the one-way clutch F1 are engaged. The sub-transmission mechanism 40 releases the brake B4 and engages the UD direct clutch C3. In this state, the ring gear R4 and the sun gears S3, S4 are connected with each other, so that the planetary gear units 41, 42 are directly connected with each other and rotate together integrally. As a result, the second speed of the main transmission mechanism 30 and the direct connection state (third speed) in the sub-transmission mechanism 40 are combined to provide the automatic transmission mechanism 5 as a whole with output of rotation at fourth speed.

In fifth (5TH) speed, the forward clutch C1 and the direct clutch C2 are engaged, and the rotation of the input shaft 37 is transmitted to the ring gear R1 and the sun gear S1 simultaneously. As a result, the main transmission mechanism 30 is changed to a state where the elements of the gear unit 31 are directly connected and rotate integrally. In addition, the sub-transmission mechanism 40 has the UD direct clutch C3 engaged and the planetary gear units 41, 42 are directly connected and rotate together. Third speed (direct connection) of the main transmission mechanism 30 and the third speed (direct connection) of the sub-transmission mechanism 40 are combined so that the automatic transmission mechanism 5 as a whole outputs rotation at the fifth speed.

For reverse, state, the direct clutch C2 and the brake B3 are engaged, and also the brake B5 is engaged. In this state, reverse rotation is output by the main transmission mechanism 30. In the sub-transmission mechanism 40, the carrier CR4 is stopped by the brake B5, and the sub-transmission mechanism 40 remains in first speed. As a result, the reverse rotation of the main transmission mechanism 30 and the first speed rotation of the sub-transmission mechanism 40 combine to output a reverse rotation at a reduced speed.

In FIG. 2(b), the symbol Δ indicates that the engine brake is applied. Specifically, in first speed, the brake B3 is engaged and fixes the ring gear R2, in place of the one-way clutch F2. In the second, third, and fourth speeds, the brake B1 is engaged and fixes the sun gear S2, as a substitute for the one-way clutch F1.

Figure 3:
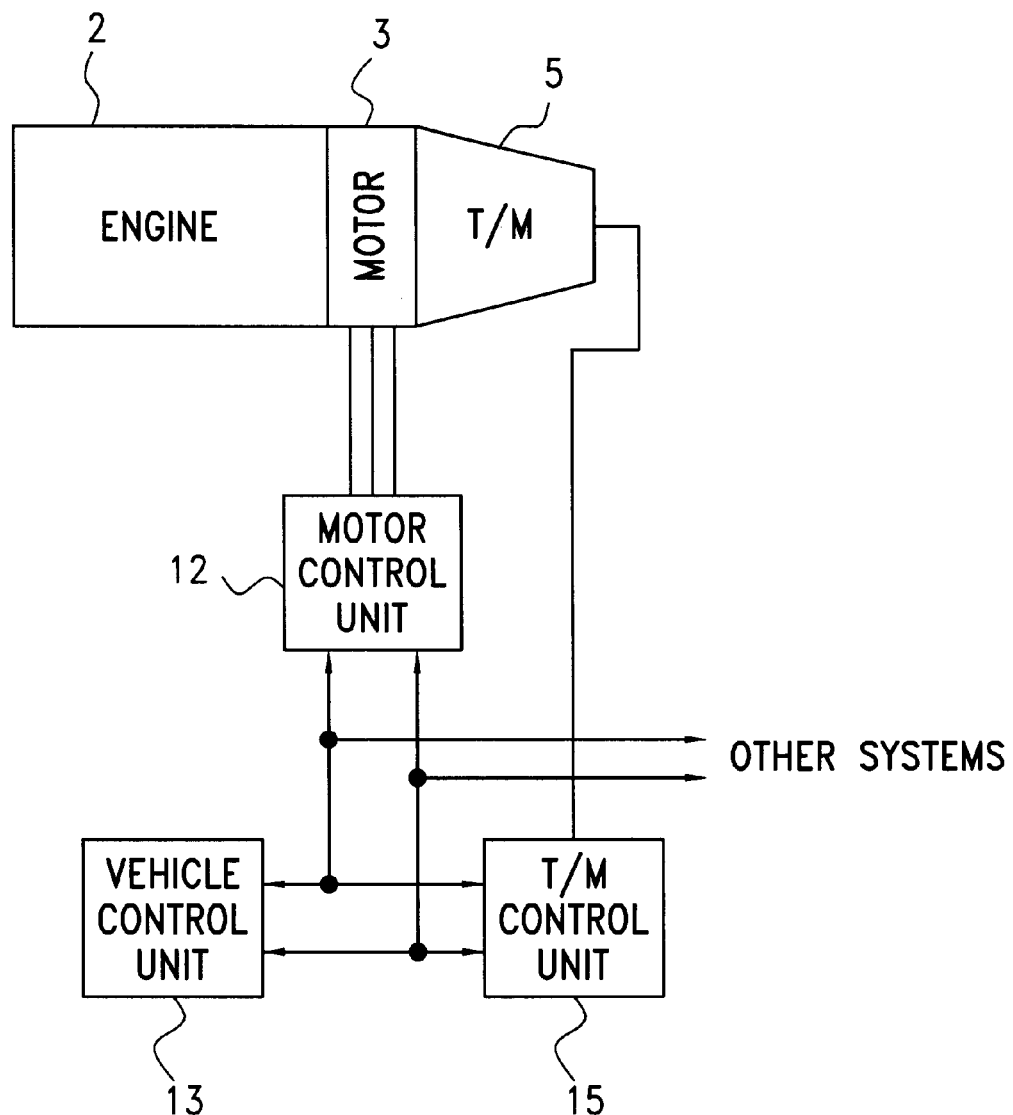
FIG. 3 is a block diagram of the control system for a hybrid vehicle in accordance with the present invention.
Figure 4:
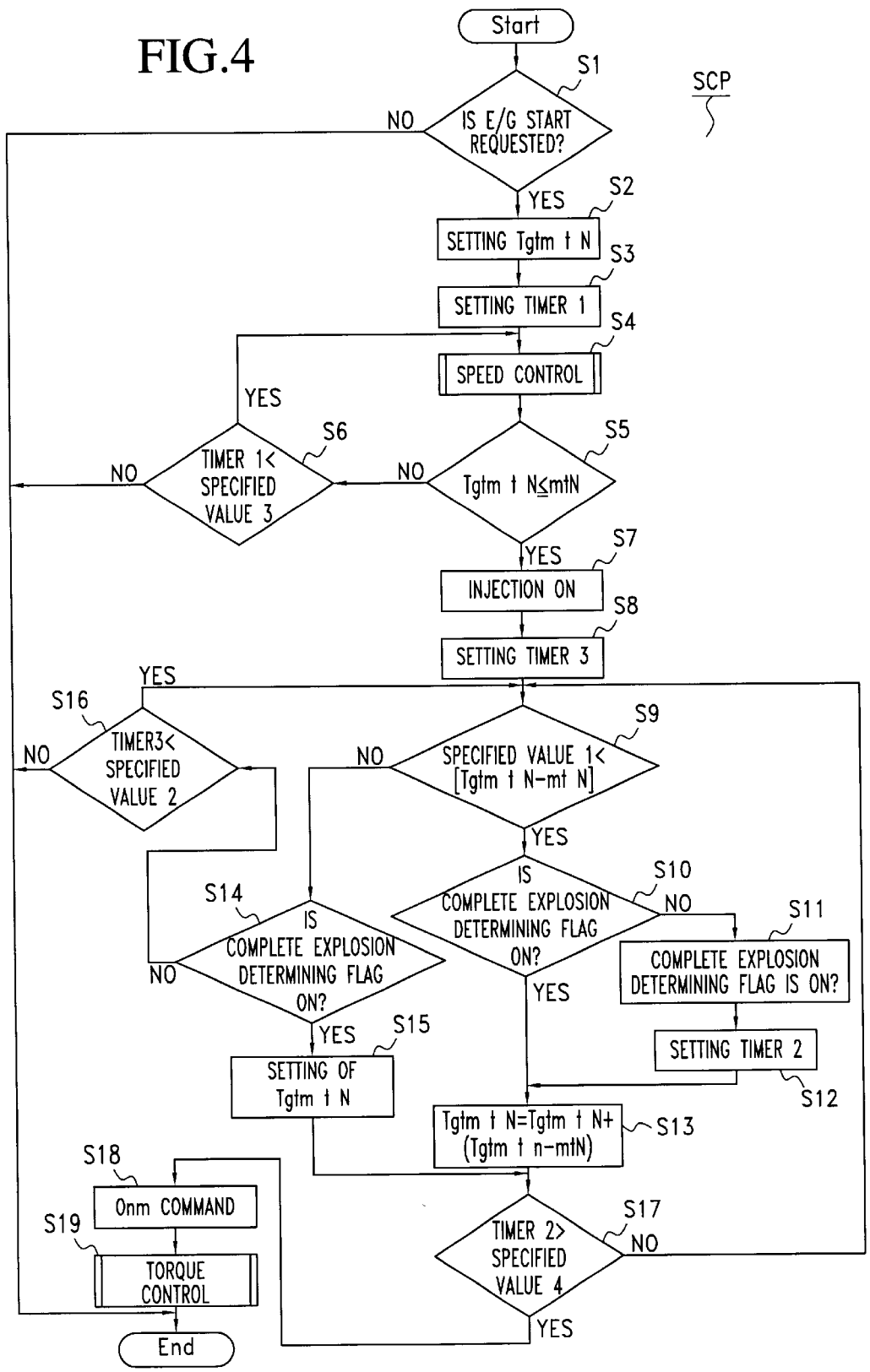
FIG. 4 is a flow chart showing one embodiment of a start control program utilized in the present invention.

As shown in FIG. 3, a motor control unit 12 is provided for controlling the motor/generator 3. A vehicle control unit 13 and a transmission control unit 15 and the like are connected to the motor control unit 12.

With a hybrid vehicle as described above, if a driver releases the foot brake at the time when the vehicle is to be started from its stopped state, a signal is input from a brake sensor (unillustrated) to the vehicle control unit 13. The vehicle control unit 13, responsive to receipt of that signal, executes a start control program SCP which is stored in a memory, so as to control the motor/generator 3 at the time of starting.

Figure 5:
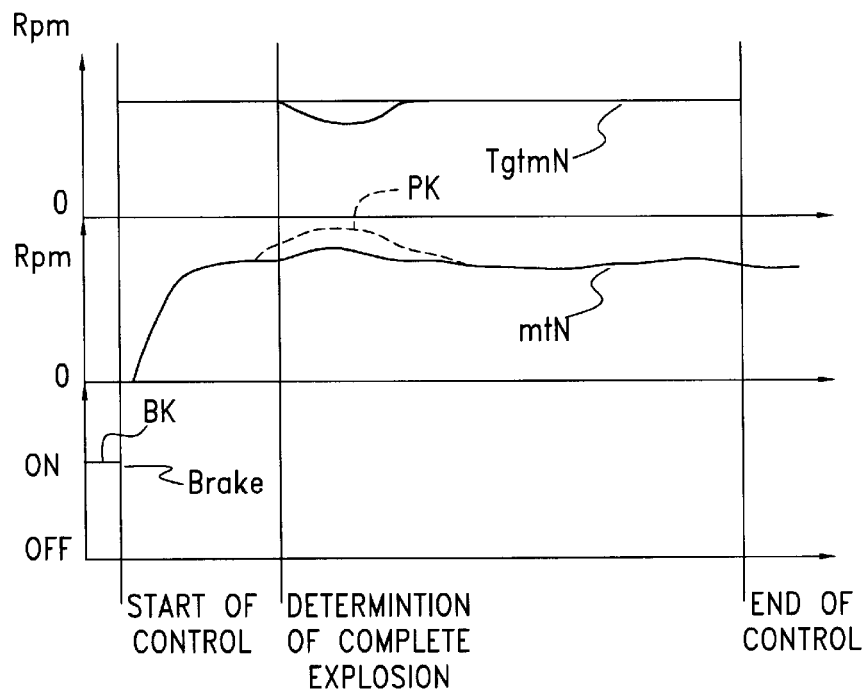
FIG. 5 is a time chart showing a target motor rotational speed, actual motor rotational speed, and a brake signal at the time of starting.
Figure 6:
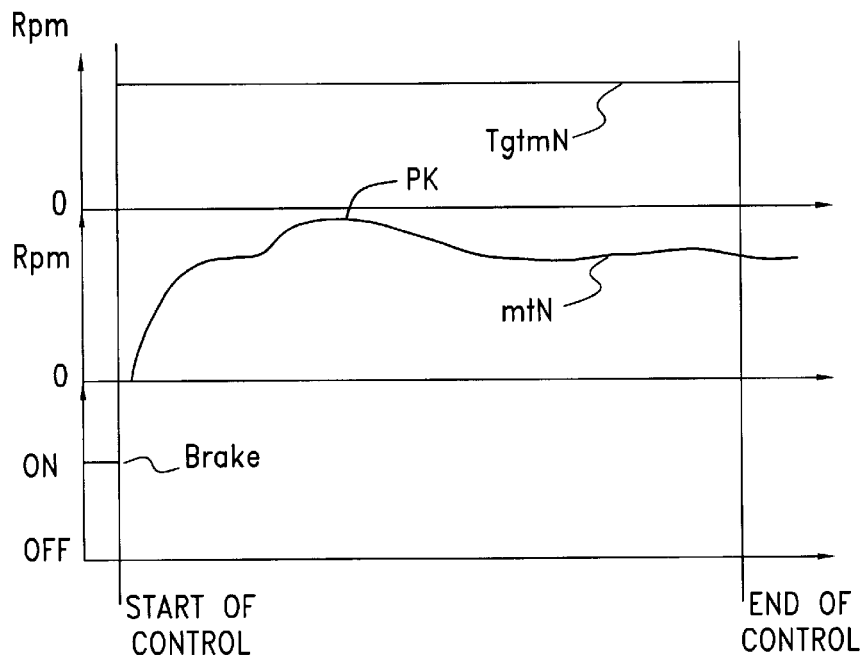
FIG. 6 is a time chart showing a target motor rotational speed at the time when an internal combustion engine is started, actual motor rotational speed, and a brake signal in a conventional hybrid vehicle.

Specifically, in Step S1 of the start control program SCP, the vehicle control unit 13 determines whether or not there is a demand from the driver for starting the engine, based on a signal supplied from the brake sensor described above, or the like. More specifically, as shown in FIG. 5, when the vehicle control unit 13 detects that the signal BK supplied from the brake sensor is changed from an ON state, where the brake pedal is depressed, to an OFF state, where the brake is released, the vehicle control unit 13 determines that there is a demand from the driver for starting the engine. Then, the procedure proceeds to Step S2.

Conversely, if there is no demand for starting the engine, such as when the signal BK supplied from the brake sensor remains in an ON state, meaning that the brake pedal is engaged, the start control program SCP is finished, because there is no need for the start control by the start control program SCP.

In Step S2, a target motor rotational speed TgtmtN is set. The target motor rotational speed TgtmtN is a target value for the rotational speed of the motor/generator 3 when, at the time of starting the internal combustion engine, the motor/generator 3 is driven to rotate the engine 2. Basically, the target motor rotational speed TgtmtN is the idling rotational speed of the engine. Alternatively, the degree of depression of the accelerator pedal by the driver is detected at the time of starting the vehicle. Then, from the throttle opening corresponding to that amount of accelerator depression, the corresponding rotational speed of the engine is obtained from a map. The thus obtained rotational speed of the engine may be set as the target motor rotational speed TgtmtN.

Next, the routine proceeds to Step S3 where a timer 1 is set. Then, in Step S4, the vehicle control unit 13 instructs the motor control unit 12 to control the motor torque of the motor/generator 3 in such a manner that the actual rotational speed of the motor/generator 3 mtN becomes the target motor rotational speed TgtmtN which has been set in Step S2.

As a result, the motor/generator 3 is started and the actual motor rotational speed mtN sharply rises toward the target motor rotational speed TgtmtN as shown in FIG. 5.

The routine then proceeds to Step S5 of the start control program SCP wherein the vehicle control unit 13 detects the rotational speed of the motor/generator 3, and determines whether or not the actual motor rotational speed mtN has reached the target motor rotational speed TgtmtN.

If the vehicle control unit 13 determines that the actual motor rotational speed mtN has still not reached the target motor rotational speed TgtmtN, the routine goes to Step S6. In Step S6, it is determined whether or not the time displayed on the timer 1 is lower than a specified value 3.

If the time displayed on the timer is a predetermined value 3 or lower, the routine returns to Step S4. In Step S4, the vehicle control unit 13 continues to operate the motor control unit 12 to control the motor speed in such a manner that the actual motor rotational speed mtN increases to the target motor rotational speed TgtmtN.

If the time displayed on the timer 1 is a predetermined value 3 or higher, this means that the actual motor rotational speed mtN has not reached the target motor rotational speed TgtmtN within the predetermined time of value 3 (Normally about 3 m sec). In this case, the vehicle control unit 13 determines that trouble has occurred in the motor/generator 3 and that the motor/generator 3 is not operating in accordance with the command value supplied from the motor control-unit 12. Therefore, the vehicle control unit 13 determines that the motor has failed, and cancels further execution of the start control program SCP.

In Step S5, if the vehicle control unit 13 determines that the actual motor rotational speed mtN has reached the target motor rotational speed TgtmtN, the routine goes to Step S7.

In Step S7, the vehicle control unit 13 outputs a command for injection of fuel into the engine 2 so as to ignite the engine 2. Then, the procedure proceeds to Step S8 where the timer 3 is set.

After that, the start control program proceeds to Step S9. In Step S9, the vehicle control unit 13 determines whether or not the difference between the target motor rotational speed TgtmtN and the actual motor rotational speed mtN is higher than a predetermined value 1 (normally, about 30 rpm). If the difference between the target motor rotational speed TgtmtN and the actual motor rotational speed mtN is a predetermined value 1 or higher, that is, if an increase in the actual motor rotational speed mtN, which cannot be controlled by the motor control unit 12, is observed after the engine 2 is ignited in Step S7 and the engine 2 starts to rotate independently, the routine goes to Step S10. In Step S10, the vehicle control unit 13 determines whether or not a complete ignition flag is ON.

If the complete ignition flag is not ON, the routine goes to Step S11. In Step S11, the complete ignition flag is turned on. Then, in Step 12, the timer 2 is set.

After the timer 2 is set in Step S12, or in Step 10 if the vehicle control unit 13 determines that the complete ignition flag is already ON, the routine goes to Step 13 where the current target motor rotational speed TgtmtN is changed according to the following equation.

$$TgtmtN = TgtmtN + (TgtmtN - mtN)$$

Specifically, the difference (TgtmtN−mtN) between the current target motor rotational speed TgtmtN and the actual motor rotational speed mtN is obtained. Since the engine 2 is started, the actual motor rotational speed mtN exceeds the target motor rotational speed TgtmtN, and the difference (TgtmtN−mtN) is a negative value. Then, the current target motor rotational speed TgtmtN is reset to a value lower by that difference so as to suppress the sharp increase in the actual motor rotational speed mtN.

In the case described above, the difference (TgtmtN−mtN) between the current target motor rotational speed TgtmtN and the actual motor rotational speed mtN is used as a value for downward revision of the target motor rotational speed to obtain a new target motor rotational speed TgtmtN. Then, the current target motor rotational speed TgtmtN is lowered by the value for the downward revision to set the new target motor rotational speed TgtmtN. However, the value for the downward revision of the rotational speed is not limited to the differential between the current target motor rotational speed TgtmtN and the actual motor rotational speed mtN, and another value, for example a constant value or a predetermined value corresponding to the difference (TgtmtN−mtN), may be employed.

As a result, the motor control unit 12 controls the motor/generator 3 in such a manner that the actual motor rotational speed mtN becomes the new target motor rotational speed TgtmtN which has been reset as a rotational speed lower than the original target motor rotational speed TgtmtN. In this manner, as is shown in FIG. 5, the motor/generator 3 is controlled so as to lower the peak PK from where it would have risen if the target motor rotational speed TgtmtN had not been revised. Thus, the actual motor rotational speed mtN changes as indicated by the broken line in FIG. 5. This control effectively suppresses the increase in the actual motor rotational speed mtN, and prevents a shock from being conveyed to the axles 45*l*, 45*r* via the automatic transmission mechanism 5. As a result, the driver can start the vehicle free from shock.

If, in Step S9, the vehicle control unit 13 determines that the difference between the target motor rotational speed TgtmtN and the actual motor rotational speed mtN is not a predetermined value 1 or higher, that is, the vehicle control unit 13 determines that there is no rapid increase ("blow-up") after the engine 2 is ignited, the routine goes to Step S14. In Step S14, the vehicle control unit 13 determines whether or not the complete ignition flag is ON. If the complete ignition flag is ON, the vehicle control unit 13 determines that the "blow-up" has been effectively suppressed due to the result of the downward revision of the target motor rotational speed TgtmtN in Step S13. Then, in Step S15, the value of the target motor rotational speed TgtmtN, which has been revised downward in Step S13, is returned to the original value which has been set in Step S2.

On the other hand, in Step S14, if the vehicle control unit 13 determines that the complete ignition flag is not ON, the routine goes to Step S16. In Step S16, the vehicle control unit 13 determines whether or not the time value 3 for the time elapsed after the engine is ignited is lower than a predetermined value 2. The predetermined value 2 defines the maximum time limit (normally, about 3 m sec) from when the ignition of the engine is confirmed after the instruction to ignite the engine is provided until when the complete ignition flag becomes ON. If the time is at a predetermined value 2 or lower, the engine has been ignited within the time limit. Therefore, the routine goes to Step S9 where the vehicle control unit 13 determines whether or not the complete ignition flag is ON. Contrarily, if the time 3 is at a predetermined value 2 or higher, the vehicle control unit 13 determines that the ignition of the engine failed, and cancels the execution of the start control program SCP.

If the target motor rotational speed TgtmtN is revised downward in Step S13, it is determined whether or not the value of the time 2 which has been set in Step S12 exceeds a predetermined value 4. The predetermined value 4 is a value for the time required for the actual motor rotational speed mtN to reach the target motor rotational speed TgtmtN after a complete ignition is determined in Step S11. The predetermined value 4 is normally set to about 2 m sec.

If the value for the time 2 exceeds the predetermined value 4, the routine goes to Step S18. In Step S18, the vehicle control unit 13 instructs the motor control unit 12 to stop the motor/generator 3, in order to finish the starting operation by the motor/generator 3. In response to this instruction, the motor control unit 12 outputs a command for setting the driving torque of the motor/generator 3 to 0 Nm. Then, in Step S19, the motor/generator is controlled in correspondence with this command in Step S19 so as to be stopped, and the starting operation in accordance with the start control program SCP is finished.

Due to the downward revision of the target motor rotational speed TgtmtN after it is determined whether or not the complete ignition flag is on, as shown in FIG. 5, the input rotational speed which is input into the input shaft 37 of the automatic transmission mechanism 5, that is, the actual motor rotational speed mtN of the motor generator 3 can change smoothly, without a significant peak PK, as conventionally observed. In this manner, the occurrence of shock accompanied by an immediate acceleration and the like can be prevented.

In the embodiment described above, reference has been made as to a hybrid vehicle having a drive source in which the output shaft of the motor/generator 3 and the output shaft of the internal combustion engine, i.e., engine 2, are directly connected to each other. However, the connection between the output shaft of the motor/generator 3 and the output shaft of the internal combustion engine is not limited to such a direct connection. Alternatively, various other connections may be employed such as a connection via a clutch or via a gear wheel.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A control system for a hybrid vehicle including an internal combustion engine and a motor drivably connected to the internal combustion engine, for driving the internal combustion engine at the time of starting of the internal combustion engine, said system comprising:

a motor control unit for driving the motor to cause the motor to rotate at a predetermined target motor rotational speed when the internal combustion engine is to be started;

a vehicle control unit for, at the time when the rotational speed of the internal combustion engine has reached the predetermined rotational speed, outputting an ignition command to the internal combustion engine to start the internal combustion engine and for, after the ignition command is output to the internal combustion engine, calculating a difference between the target rotational speed of the motor and the actual rotational speed of the motor, and if the calculated difference exceeds a predetermined value, confirming that the internal combustion engine has been started.

2. A control system for a hybrid vehicle according to claim 1, wherein responsive to confirmation that the internal combustion engine has been started, the vehicle control unit sets a new target motor rotational speed by lowering the target motor rotational speed by a calculated value;

wherein the motor control unit drives the motor to cause the motor to rotate, at the new target motor rotational speed which has been set.

3. A control system for a hybrid vehicle according to claim 2, wherein the vehicle control unit calculates the value for lowering of the rotational speed based on the determined difference between the current target motor rotational speed and the actual motor rotational speed.

4. A control system for a hybrid vehicle according to claim 1, wherein an output shaft of the motor and an output shaft of the internal combustion engine are directly connected to each other.

5. A method for starting an internal combustion engine in a hybrid vehicle wherein the internal combustion engine is drivably connected to a motor, said method comprising:

energizing the motor to cause the motor to drive the internal combustion engine to bring the rotational speed of the internal combustion engine from zero to a target rotational speed;

injecting fuel into the internal combustion engine at the target rotational speed;

outputting an ignition command signal to the internal combustion engine at the target rotational speed;

after output of the ignition command signal, determining a difference between actual rotational speed of the motor and the target rotational speed; and confirming start of the internal combustion engine when the determined difference exceeds a predetermined value.

6. A method according to claim 5, further comprising:

responsive to confirmation of start of the internal combustion engine, resetting the target rotational speed to a lower value; and driving the motor at the lower, reset rotational speed.

7. A method according to claim 6, wherein the resetting of the target rotational speed is based on the determined difference.

* * * * *